(12) United States Patent
Salem et al.

(10) Patent No.: US 10,605,859 B2
(45) Date of Patent: Mar. 31, 2020

(54) VISIBLE ALIGNMENT MARKERS/LANDMARKS FOR CAD-TO-SILICON BACKSIDE IMAGE ALIGNMENT

(71) Applicant: QUALCOMM Incorporated, San Diego, CA (US)

(72) Inventors: Rami Salem, San Diego, CA (US); Lesly Zaren V. Endrinal, San Diego, CA (US); Hyeokjin Lim, San Diego, CA (US); Hadi Bunnalim, San Diego, CA (US); Robert Kim, San Marcos, CA (US); Lavakumar Ranganathan, San Diego, CA (US); Mickael Malabry, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 549 days.

(21) Appl. No.: 15/265,744

(22) Filed: Sep. 14, 2016

(65) Prior Publication Data

US 2018/0074117 A1     Mar. 15, 2018

(51) Int. Cl.
*G01R 31/28* (2006.01)
*H01L 23/50* (2006.01)
(Continued)

(52) U.S. Cl.
CPC ..... *G01R 31/2891* (2013.01); *G01R 31/2834* (2013.01); *G01R 31/311* (2013.01);
(Continued)

(58) Field of Classification Search
CPC ............ G01R 31/2891; G01R 31/2834; G01R 31/311; H01L 23/5286; H01L 23/544;
(Continued)

(56) References Cited

U.S. PATENT DOCUMENTS 7,413,920 B2    8/2008  Ko et al.
7,919,792 B2 *  4/2011  Law .................... H01L 27/0207
                                                      257/202
(Continued)

OTHER PUBLICATIONS

Boit C., et al., "Physical IC Debug-Backside Approach and Nanoscale Challenge", Advances in Radio Science, vol. 6, Jan. 1, 2008, pp. 265-272, XP055434178, DOI: 10.5194/ars-6-265-2008.
(Continued)

*Primary Examiner* — Christopher P McAndrew
*Assistant Examiner* — Zannatul Ferdous
(74) *Attorney, Agent, or Firm* — Arent Fox, LLP

(57) ABSTRACT

A MOS IC includes a first standard cell including first and second power rails, first and second active regions, and a plurality of metal interconnects. The first power rail extends in a first direction and provides a first voltage to the first standard cell. The second power rail extends in the first direction and provides a second voltage to the first standard cell. The first active region is between the first and second power rails on a first side of the first standard cell. The second active region is between the first and second power rails on a second side of the first standard cell. The second active region is separated from the first active region. The plurality of metal interconnects extend in a second direction between the first and second active regions and between the first and second power rails. The second direction is orthogonal to the first direction.

17 Claims, 12 Drawing Sheets

(51) Int. Cl.
    *H01L 27/02*     (2006.01)
    *H01L 27/088*     (2006.01)
    *G01R 31/311*     (2006.01)
    *H01L 23/544*     (2006.01)
    *H01L 23/528*     (2006.01)
    *H01L 27/118*     (2006.01)

(52) U.S. Cl.
    CPC .......... *H01L 23/50* (2013.01); *H01L 23/5286* (2013.01); *H01L 23/544* (2013.01); *H01L 27/0886* (2013.01); *H01L 27/0207* (2013.01); *H01L 27/11807* (2013.01); *H01L 2223/54426* (2013.01)

(58) Field of Classification Search
    CPC ................ H01L 27/0886; H01L 23/50; H01L 27/11807; H01L 27/0207; H01L 2223/54426
    See application file for complete search history.

(56) References Cited

U.S. PATENT DOCUMENTS

| | | | |
|---|---|---|---|
| 8,895,404 B2 | 11/2014 | Wang et al. | |
| 8,928,159 B2 | 1/2015 | Chang et al. | |
| 9,070,552 B1* | 6/2015 | Shah | H01L 27/0207 |
| 9,275,890 B2 | 3/2016 | Wei et al. | |
| 2006/0136848 A1* | 6/2006 | Ichiryu | G06F 17/5072 |
| | | | 716/120 |
| 2008/0042066 A1* | 2/2008 | He | H01L 27/14621 |
| | | | 250/361 R |
| 2008/0111158 A1 | 5/2008 | Sherlekar et al. | |
| 2012/0286341 A1* | 11/2012 | Chen | H01L 27/0805 |
| | | | 257/296 |
| 2014/0167815 A1 | 6/2014 | Penzes | |
| 2015/0177313 A1* | 6/2015 | Hoelter | G02B 27/0977 |
| | | | 324/754.21 |
| 2015/0263039 A1* | 9/2015 | Singh | H01L 27/11807 |
| | | | 257/206 |
| 2016/0008602 A1* | 1/2016 | Perryman | H02J 50/20 |
| | | | 607/61 |
| 2016/0013092 A1* | 1/2016 | Aika | H01L 21/76224 |
| | | | 438/435 |
| 2016/0027739 A1 | 1/2016 | Park et al. | |
| 2016/0284695 A1* | 9/2016 | Liaw | H01L 27/088 |
| 2018/0219127 A1* | 8/2018 | Hoeppel | H01L 33/0079 |

OTHER PUBLICATIONS

International Search Report and Written Opinion—PCT/US2017/047847—ISA/EPO—dated Dec. 21, 2017.

* cited by examiner

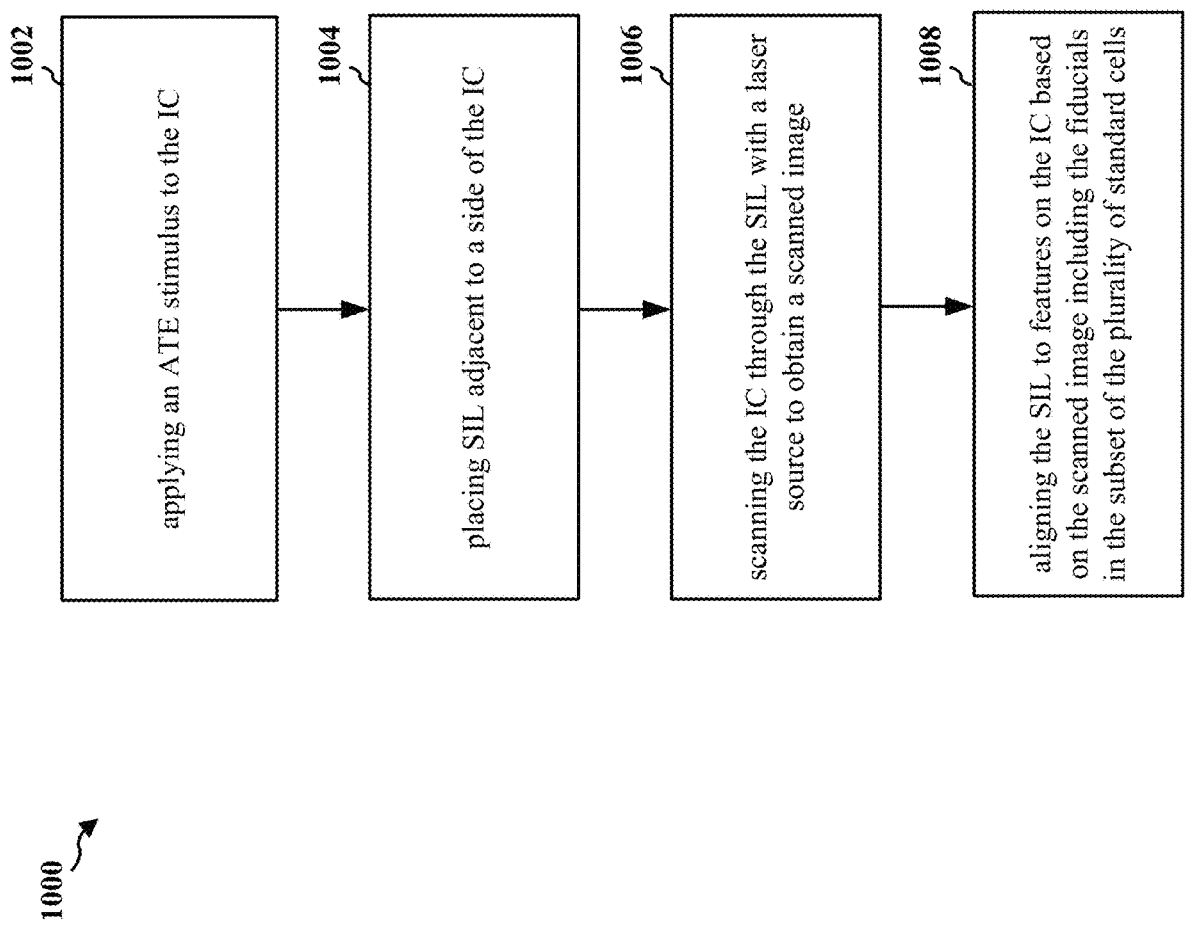

VISIBLE ALIGNMENT MARKERS/LANDMARKS FOR CAD-TO-SILICON BACKSIDE IMAGE ALIGNMENT

FIELD

The present disclosure relates generally to semiconductor design, and more particularly, to visible alignment markers on active silicon substrate for computer-aided design (CAD)-to silicon backside image alignment.

BACKGROUND

Laser voltage imaging (LVI) and Laser voltage probing (LVP) are laser-based voltage and timing waveform acquisition techniques used to perform failure analysis on flip-chip integrated circuits (ICs) or to localize failures in ICs. The LVP tool CAD alignment process includes a coarse three point alignment at very low magnification using solid immersion lens (SIL). The SIL is a spring-loaded lens that makes direct contact with the backside of the silicon substrate of the IC for high resolution imaging (e.g., LVI, Laser Scanning Microscope (LSM) image). However, due to the spring nature of the SIL, the LSM image can be slightly off with respect to the CAD when the SIL first makes a contact with the silicon substrate or whenever the SIL shifts to a different location. In 10 nm and smaller IC technology, with the increasing density and decreasing feature sizes, the current electrical fault isolation (EFI) tools (e.g., LVP) are reaching the limit of image resolution, which consequently translates to problems with CAD-to-image alignment, since it becomes very hard to distinguish one feature from another. Therefore, there is a need for visible alignment markers in 10 nm and smaller IC technology for a precise local alignment during the LVP measurement of an IC for EFI to ensure that the correct standard cell or signal is being probed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In 10 nm and smaller IC technology, with the increasing density and decreasing feature sizes, the current EFI tools (e.g., LVP) are reaching the limit of image resolution, which consequently translates to problems with CAD-to-image alignment, since it becomes very hard to distinguish one feature from another. Therefore, there is a need for visible alignment markers in 10 nm and smaller IC technology for a precise local alignment during the LVP measurement of an IC for EFI to ensure that the correct standard cell or signal is being probed.

In an aspect of the disclosure, a metal oxide semiconductor (MOS) IC includes a first standard cell. The first standard cell includes a first power rail configured to provide a first voltage to the first standard cell. The first power rail extends in a first direction. The first standard cell further includes a second power rail configured to provide a second voltage less than the first voltage to the first standard cell. The second power rail extends in the first direction. The first standard cell also includes a first active region between the first power rail and the second power rail on a first side of the first standard cell. In addition, the first standard cell includes a second active region between the first power rail and the second power rail on a second side of the first standard cell. The second side of the first standard cell is opposite to the first side of the first standard cell. The second active region is separated from the first active region. Moreover, the first standard cell includes a plurality of metal interconnects extending in a second direction between the first active region and the second active region and between the first power rail and the second power rail. The second direction is orthogonal to the first direction.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 10 is a flowchart of a method of probing a MOS IC.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of semiconductor systems will now be presented with reference to various apparatus and methods.

These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

LVI and LVP are laser-based voltage and timing waveform acquisition techniques that may be used to perform failure analysis on flip-chip ICs or to localize failures in ICs. Using the LVP technique, timing data of internal signals of the IC may be measured as waveforms directly from the P-N junctions in the IC through the backside of silicon on flip-chip devices. The LVP tool may use a CAD alignment tool to align and sync a laser scan image of the IC substrate with the chip design layout to navigate to the point of interest for probing.

Figure 1A:
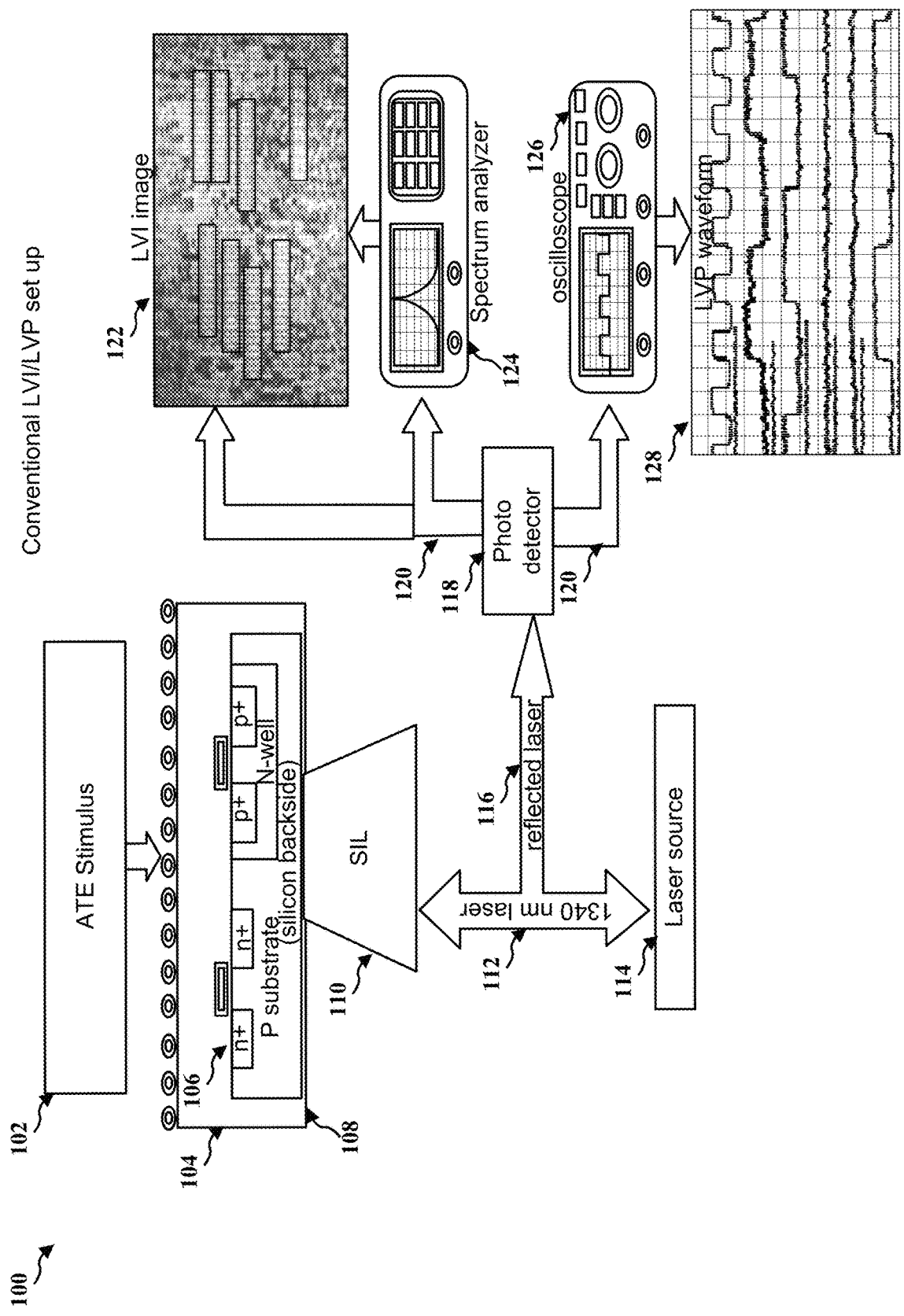
FIG. 1A illustrates a conventional LVP/LVI system setup to perform a CAD-to-silicon backside image alignment process.
Figure 1B:
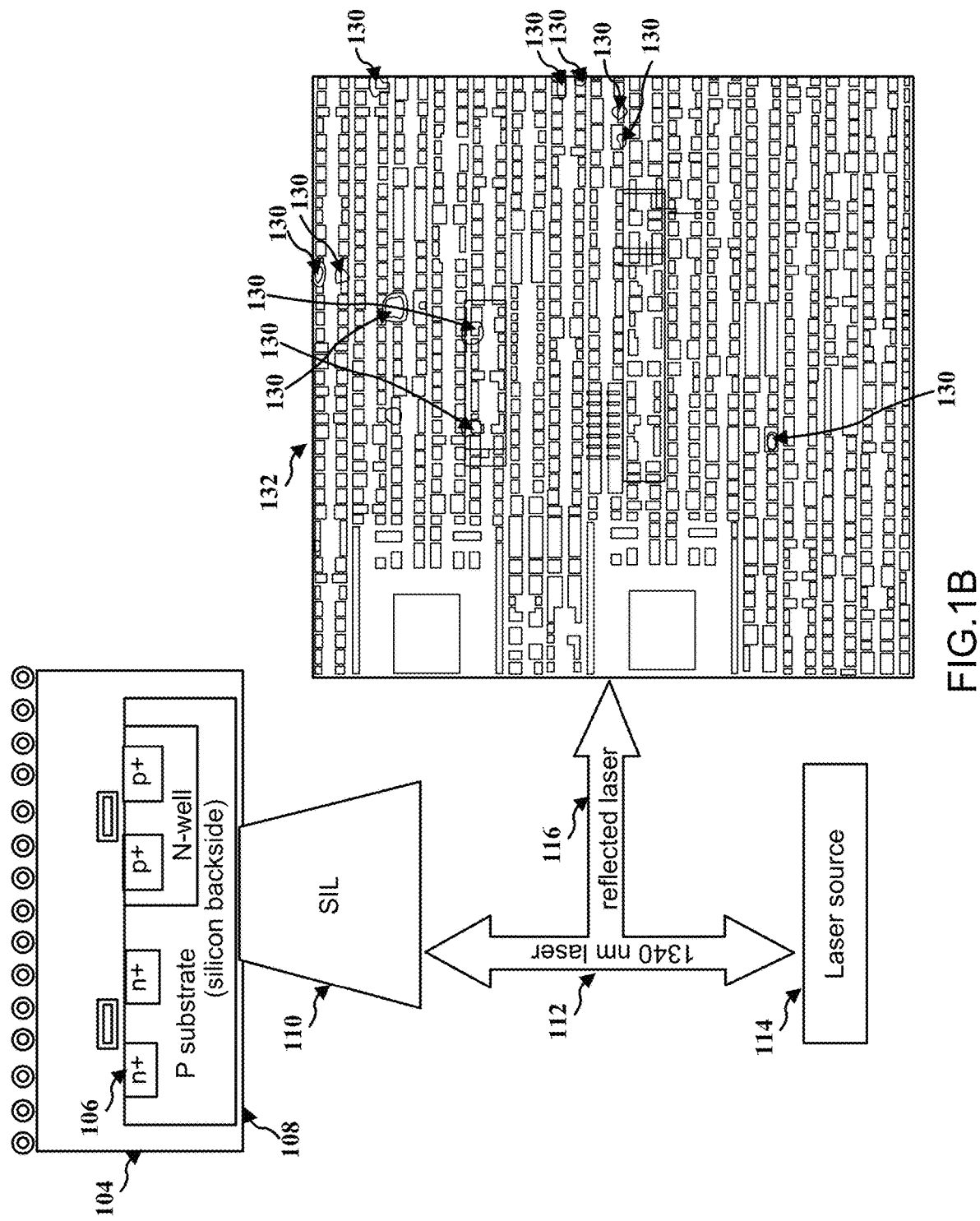
FIG. 1B illustrates a portion of the LVP/LVI system of FIG. 1A and an acquisition of LSM image.

FIG. 1A illustrates a conventional LVP/LVI system 100 setup to perform a CAD-to-silicon backside image alignment process. FIG. 1B illustrates a portion of the conventional LVP/LVI system 100 and an acquisition of LSM image. Typically, in order to perform LVI/LVP, the device 104 to be analyzed is de-encapsulated in order to expose the backside 108 of the silicon substrate 106. The silicon substrate 106 may be thinned mechanically using a back side mechanical thinning tool. The thinned device 104 is then mounted on a movable stage and connected to an electrical stimulus source called automatic test equipment (ATE) stimulus 102. Signal measurements may be performed through the back side 108 of the device 104 after silicon substrate 106 thinning has been performed. The device 104 being probed may be electrically stimulated using a repeating test pattern, with a trigger pulse provided to the LVP as reference.

A laser 112 from a laser source 114 may scan the backside 108 of the silicon substrate 106 via a high magnification SIL 110 and may be reflected back 116 to a photo detector 118. The incident beam of the laser 112 may be focused onto the active layer of the silicon substrate 106 so that the reflected beam 116 may provide physical details of the scanned active area of the silicon substrate 106 as an LSM image 132. Simultaneously during this scan, the reflected beam 116 may be modulated by the signal on each transistor in the scanned area of the silicon substrate 106. The high frequency component 120 of the reflected beam 116 of laser may be supplied to the input of a spectrum analyzer (SA) 124 that may be tuned to a specific frequency. The SA 124 may provide LVI image 122, which may provide information about the reflected beam 116 of laser in the frequency domain. As shown in FIG. 1A, in some cases, the high frequency component 120 of the reflected beam 116 of laser may be supplied to an oscilloscope 126 to provide information in the time domain as LVP waveform 128. If a transistor is toggling at the target specific frequency, then that transistor is highlighted in the LVI image 122, creating a spatial map 130 of the target toggling frequency when overlaid onto an LSM image 132. A user performing the LVP/LVI measurement can see at a glance if the transistors in that field of view (FOV) match expected toggling behavior. Once a suspected transistor is identified, further information can be collected using LVP.

The LVP tool CAD alignment process, as shown in FIGS. 1A, 1B, is composed of a coarse, three point alignment using a low magnification air gap lens, followed by a fine CAD alignment at very high magnification SIL 110 (e.g., LVI image 122 overlaid onto the LSM image 132 to create a spatial map 130 of the target toggling frequency). The SIL 110 is a spring-loaded lens that makes direct contact with the backside 108 of the silicon substrate 106 for high resolution imaging (e.g., LVI 122, LSM image 132). However, due to the spring nature of the SIL 110, the LSM image 132 can be slightly off with respect to the CAD when the SIL first makes a contact with the silicon substrate 106 or whenever the SIL shifts to a different location. In 10 nm and smaller technology, such offset may create significant problems in performing CAD alignment due to lack of unique features/visible alignment markers that may help with the orientation of the LVI 122 or LSM image 132. The visible alignment markers in the active layer of a silicon substrate may be used for CAD alignment of different EFI tools such as the LVP, Dynamic Laser Stimulation (DLS), and IR Emission (IREM) tools.

For example, 14 nm process uses continuous shared diffusion with no breaks in the active layer of a silicon substrate. In 14 nm process, the absence of visible alignment markers may create significant problems regarding CAD alignment of different EFI tools such as the LVP, DLS and IREM tools. For example, in the 14 nm product debugs, probing may not be achieved due to lack of markers for CAD alignment in a liquid (homogenous) layout. Such problems may be more pronounced in 10 nm and smaller technologies. In particular, in 10 nm and smaller technology, with the increasing density and decreasing feature sizes, the current EFI tools are reaching the limit of image resolution, which consequently translates to problems with CAD-to-image alignment, since it becomes very hard to distinguish one feature from another. For example, the feature sizes have significantly decreased from 14 nm to 10 nm products. Therefore, there is a need for visible alignment markers in 10 nm and smaller technology for a precise local alignment during the LVP measurement of an IC for EFI to ensure that the correct cell or signal is being probed.

Figure 2:
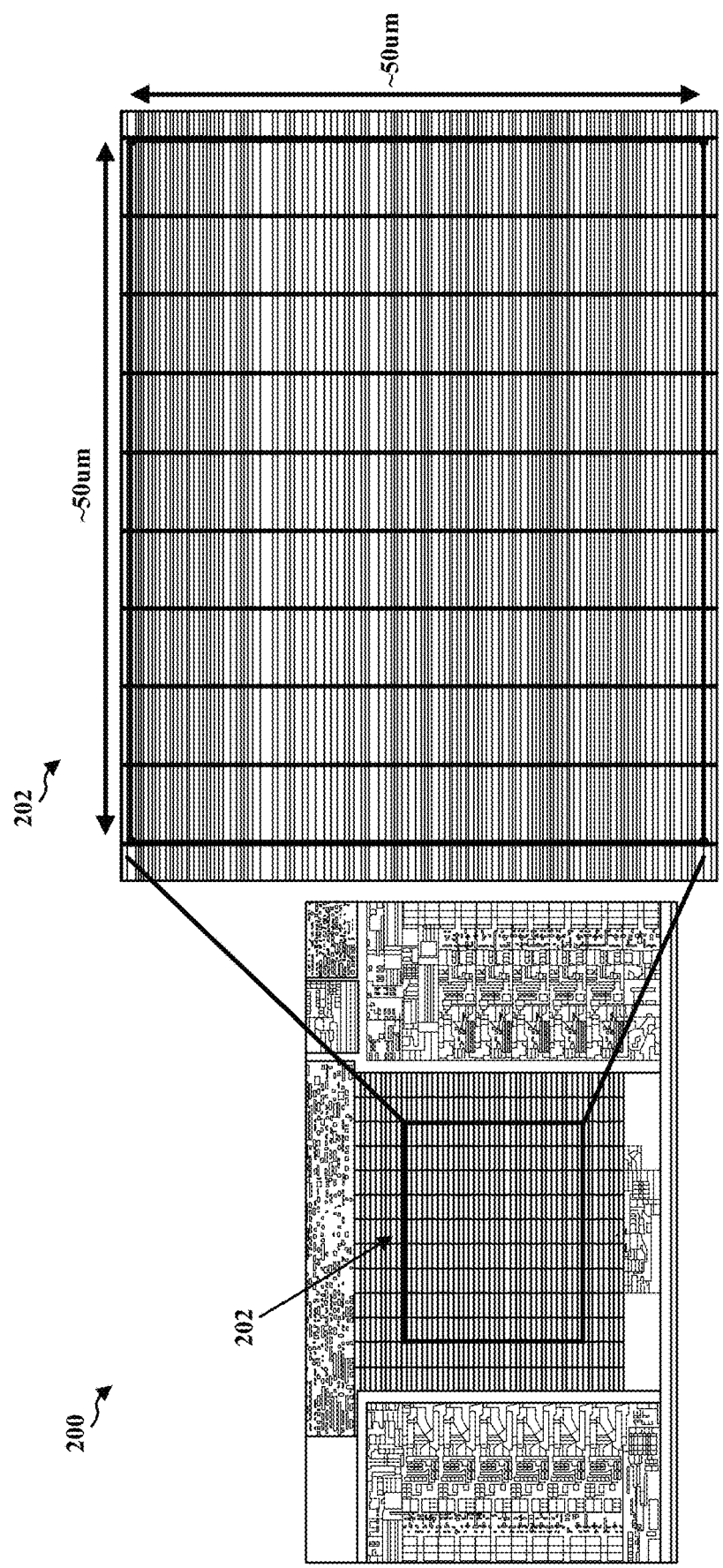
FIG. 2 illustrates an exemplary layout of a location in the active layer within a 14 nm product.

FIG. 2 illustrates an exemplary layout 200 of a location 202 (50 um×50 um corresponds to the FOV of SIL) in the active layer within a 14 nm product. In the exemplary layout 200, due to the continuous nature of the diffusion (no irregular gaps) in the active layer, the location 202 in the active layer does not have any visible alignment markers that could help with CAD alignment. Due to the lack of visible alignment markers in the active layer, performing CAD alignment during the LVP measurement of the layout 200, may be extremely difficult.

Figure 3:
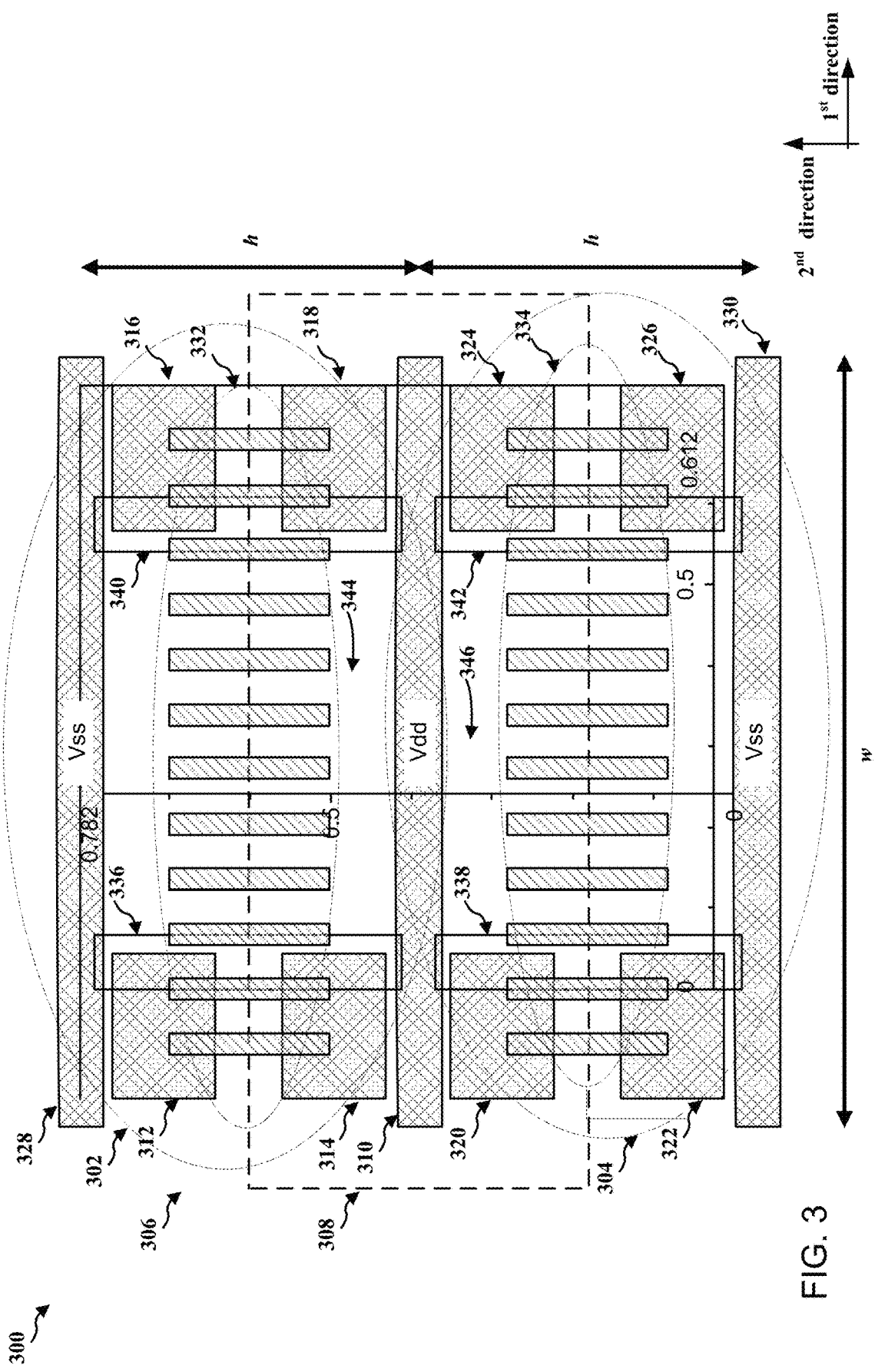
FIG. 3 is an example diagram illustrating a plan view of an example MOS IC device.

FIG. 3 is an example diagram illustrating a plan view of an example MOS IC device 300 including a first portion 302 and a second portion 304 formed on a p-type substrate 306 (e.g., silicon substrate). The MOS IC device 300 may be a double height cell with width w and height 2h. The MOS IC device 300 may be a 10 nm standard cell. The first portion 302 and the second portion 304 of the MOS IC device 300 share an n-well 308 and a power rail 310 extending in a first direction. The power rail 310 is configured to provide a positive supply voltage (e.g., Vdd) to the first portion 302 and the second portion 304 of the MOS IC device 300.

In the exemplary configuration of FIG. 3, the first portion 302 of the MOS IC device 300 includes active regions 312, 314, 316, and 318, and the second portion 304 f the MOS IC device 300 includes active regions 320, 322, 324, and 326. The active regions 314, 318 of the first portion 302 and the active regions 320, 324 of the second portion 304 of the MOS IC device 300, that are formed on the shared n-well 308, may be p-type active regions. However, the active regions 312, 316 of the first portion 302 and the active regions 322, 326 of the second portion 304 of the MOS IC device 300, that are formed on the p-type substrate 306, may be n-type active regions. In one configuration, each of the active regions 312, 314, 316, 318, 320, 322, 324, and 326 of the first portion 302 and the second portion 304 of the MOS IC device 300 may include at least one MOS fin field effect transistor (FinFET) and a plurality of fins associated with the at least one MOS FinFET. In addition, the first portion 302 includes a power rail 328 extending in the first direction that is configured to provide a negative supply voltage/ground (e.g., Vss) to the first portion 302 and the second portion 304 includes a power rail 330 extending in the first direction that is configured to provide a negative supply voltage/ground (e.g., Vss) to the second portion 304 of the MOS IC device 300. In one configuration, the MOS IC device 300 is a passive cell, which means MOS IC device 300 does not draw power from the power rails 328, 310, and 330, even though the MOS IC device 300 is connected to the power rails 328, 310, and 330.

As shown in FIG. 3, in one configuration, multiple fin cut regions 336, 338, 340, and 342 define the edges of the active regions 312, 314, 316, 318, 320, 322, 324, and 326 of the first portion 302 and the second portion 304 of the MOS IC device 300, for a layout tool. In particular, the fin cut 336 may define the edges of the active regions 312 and 314, and the fin cut 340 may define the edges of the active regions 316 and 318 of the first portion 302 of the MOS IC device 300, for a layout tool. In another configuration, the fin cut 338 may define the edges of the active regions 320 and 322, and the fin cut 342 may define the edges of the active regions 324 and 326 of the second portion 304 of the MOS IC device 300, for a layout tool.

In one configuration, the region of the p-type substrate 306 between the active regions 312 and 316, and between the active regions 314 and 318, and between the power rails 328 and 310 of the first portion 302 of the MOS IC device 300, is an inactive region 344. Similarly, the region of the p-type substrate 306 between the active regions 320 and 324, and between 322 and 326, and between the power rails 310 and 330 of the second portion 304 of the MOS IC device 300, is an inactive region 346. In one configuration, the inactive regions 344, 346 may be used to electrically isolate adjacent active regions within a standard cell device (300) and/or to electrically isolate adjacent standard cell devices from each other.

In some configurations, the first portion 302 of the MOS IC device 300 also includes a plurality of metal one (M1) interconnects 332 extending in a second direction in the inactive region 344. The second direction is orthogonal to the first direction. Similarly, the second portion 304 of the MOS IC device 300 also includes a plurality of M1 interconnects 334 extending in the second direction in the inactive region 346. In one configuration, the M1 interconnects 332 and 334 of the first portion 302 and the second portion 304 of the MOS IC device 300 may reflect substantially more electromagnetic radiation/laser compared to the active regions 312, 314, 316, 318, 320, 322, 324, and 326 of the MOS IC device 300 during the LVI/LVP CAD alignment.

In some cases, the width (e.g., at least 0.6 um) of the inactive regions 344 and 346 of the first portion 302 and the second portion 304 of the MOS IC device 300 may be bigger than the width of the inactive region in a regular standard cell. In one configuration, the width of each of the inactive regions 344 and 346 of the first portion 302 and the second portion 304 of the MOS IC device 300 may be at least 0.6 um in the first direction. In some configurations, the distance between the power rail 328 and the power rail 330 may be at least 0.7 um. However, in some configurations, the width of each of the inactive regions 344 and 346 of the first portion 302 and the second portion 304 of the MOS IC device 300 may be at least 0.7 um in the first direction and the distance between the power rail 328 and the power rail 330 may be at least 0.6 um.

Figure 4:
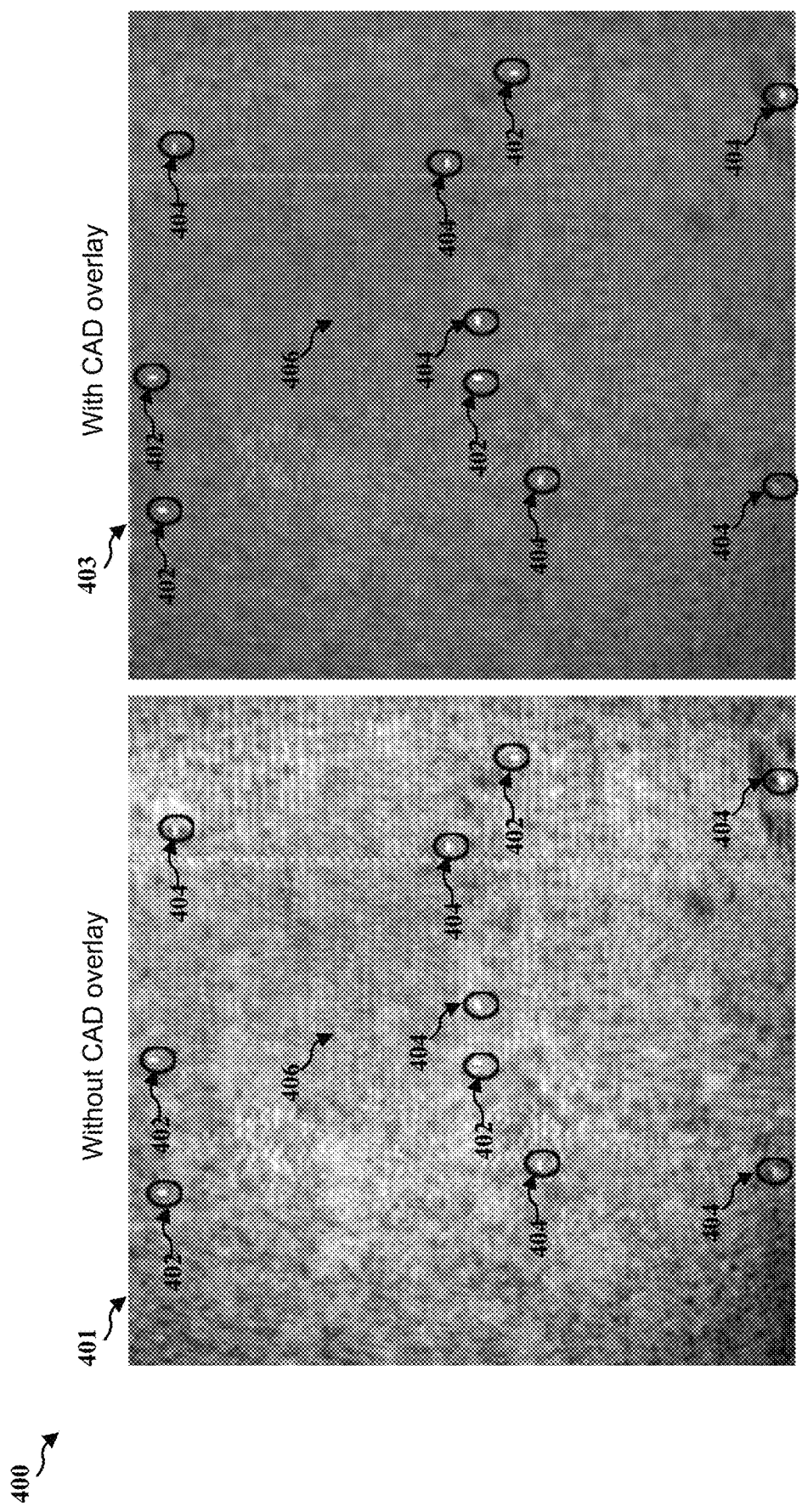
FIG. 4 illustrates two LVP images of an exemplary MOS IC device without CAD overlay and with CAD overlay.

FIG. 4 illustrates two LVP images 401 and 403 of an exemplary MOS IC device 400 without CAD overlay (401) and with CAD overlay (403). The MOS IC device 400 includes a plurality of first standard cells 402, second standard cells 404, and regular standard cells 406. In some configurations, the first standard cell 402 may be the MOS IC device 300 of FIG. 3. The first standard cell 402 may be a double height cell with width w and height 2h. The second standard cell 404 may be a single height cell with height h and may have a width greater than the width of the first standard cell 402. For example, the width of the second standard cell 404 may be twice the width 2w of the width w of the first standard cell 402.

In one configuration, the regular standard cells 406 may not include inactive regions. In some embodiments, the width of each of the inactive regions (e.g., 344, 346 of FIG. 3) of the first standard cells 402 and the second standard cells 404 may be at least 0.6 um in the first direction. In one configuration, the M1 interconnects (e.g., 332, 334 in FIG. 3) and the large (e.g., at last 0.6 um) inactive regions (e.g., 344, 346) of each of the first standard cells 402 and the second standard cells 404 may be extremely reflective of the electromagnetic radiation/laser. Therefore, the plurality of the first standard cells 402 and/or the second standard cells 404 may reflect substantially more electromagnetic radiation/laser during the LVI/LVP CAD alignment compared to the regular standard cells 406.

Also, when the plurality of the first standard cells 402 and/or the second standard cells 404 are inserted into the MOS IC device 400, due to the larger width (e.g., at least 0.6 um) of the inactive regions, the plurality of the first standard cells 402 and/or the second standard cells 404 may create unique pseudo/random pattern in MOS IC device 400. Such unique pseudo/random pattern may make the first standard cells 402 and the second standard cells 404 easily identifiable at LVP expanded magnification view during the CAD alignment process. Accordingly, the plurality of the first standard cells 402 and/or the second standard cells 404 in the MOS IC device 400 may be used as fiducials or visible alignment markers during the CAD alignment of different EFI tools (e.g., LVP).

Additionally, the typical FOV using the SIL lens for the EFI tools is 50 um×50 um. In one configuration, a plurality of the first standard cells 402 and/or the second standard cells 404 may be inserted into the MOS IC device 400 in such a way that each 50 um square area on the MOS IC device 400 may include at least two of the first standard cells 402 and/or the second standard cells 404, which may be used as fiducials during the CAD alignment of different EFI tools (e.g., LVP). In this case, without these LVP fiducials (e.g., 402, 404), CAD-to-image alignment would be almost impossible due to very dense circuitry. Image 403 shows successful CAD alignment using LVP fiducials (e.g., 402, 404) as beacons.

In one configuration, the first standard cells 402 and the second standard cells 404 may be an order of magnitude smaller compared to existing global alignment markers used in LVP/LVI CAD alignment process. Additionally, in an aspect, the first standard cells 402 and the second standard cells 404 may be single or multiple row cell height. In one configuration, the first standard cells 402 and the second standard cells 404 may not require to be pre-placed during the initial placement of different components in the substrate of the MOS IC device 400 and can be later inserted in available areas in the substrate of the MOS IC device 400.

Figure 5:
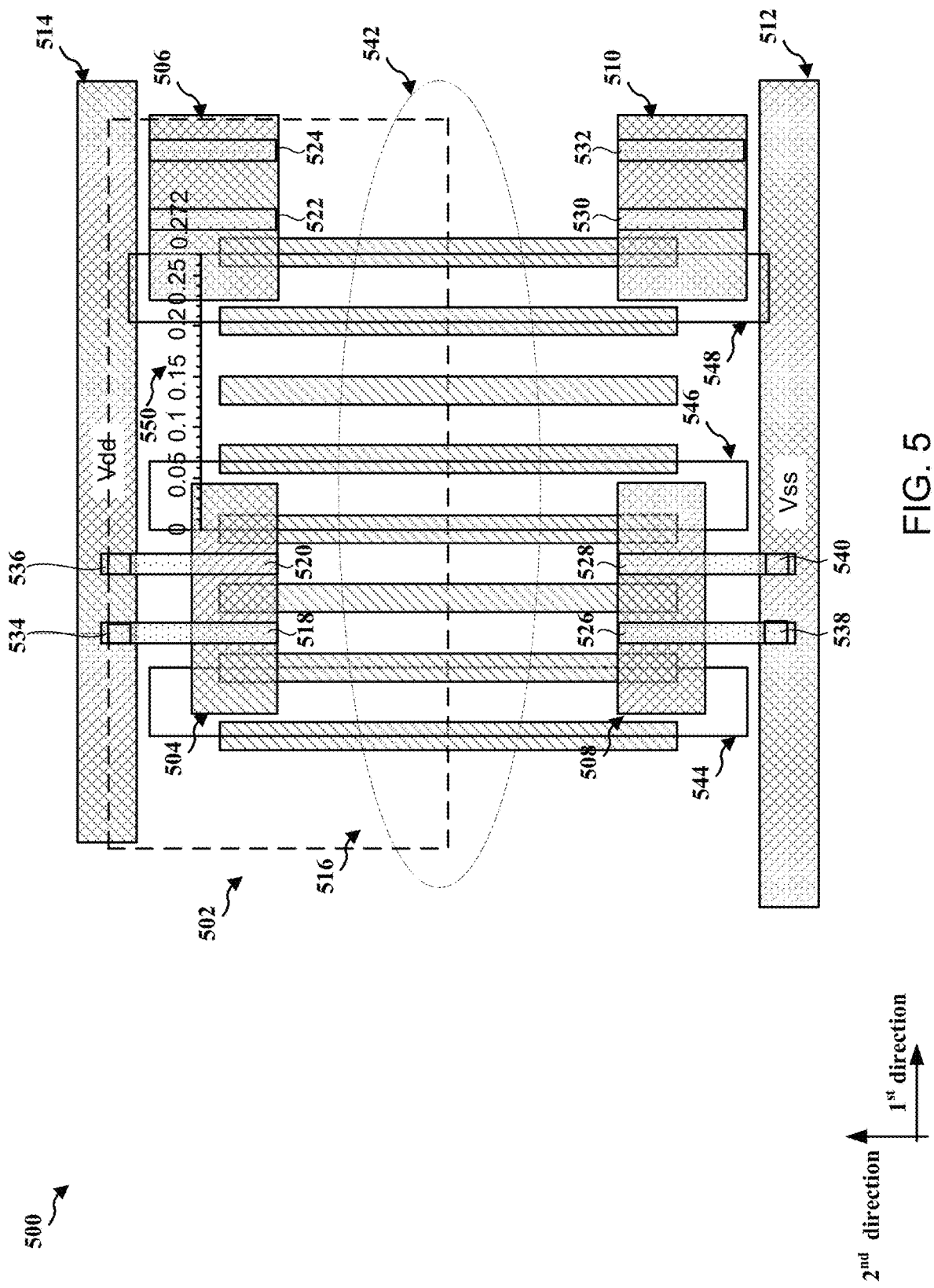
FIG. 5 is an example diagram illustrating a plan view of an example MOS IC standard tie cell device.

FIG. 5 is an example diagram illustrating a plan view of an example MOS IC standard tie cell device 500 formed on a p-type substrate 502 (e.g., silicon substrate). The standard tie cell device 500 ties an n-well 516 to Vdd and the p-type substrate 502 to Vss. The standard tie cell device 500 includes an n-well 516, a power rail 514 extending in a first direction that is configured to provide a positive supply voltage (e.g., Vdd) to the standard tie cell device 500, and a power rail 512 extending in the first direction that is configured to provide a negative supply voltage/ground (e.g., Vss) to the standard tie cell device 500.

In the exemplary configuration of FIG. 5, the standard tie cell device 500 includes active regions 504, 506, 508, and 510. The active regions 504 and 506 that are formed on the n-well 516, may be p-type active regions. However, the active regions 508 and 510 that are formed on the p-type substrate 502, may be n-type active regions. In one configuration, each of the active regions 504, 506, 508, and 510 of the standard tie cell device 500 may include at least one MOS FinFET and a plurality of fins associated with the at least one MOS FinFET. The region of the p-type substrate 502 between the active regions 504 and 506, and between 508 and 510, and between the power rails 514 and 512 of the standard tie cell device 500, is an inactive region 550. The standard tie cell device 500 also includes a plurality of M1 interconnects 542 extending in a second direction in the inactive region 550. The second direction is orthogonal to the first direction.

As shown in FIG. 5, in one configuration, multiple fin cut regions 544, 546, and 548 may define the edges of the active regions 504, 506, 508, and 510 of the standard tie cell device 500, for a layout tool. In particular, the fin cut 544 may define a first side of the edges of the active regions 504 and 508, the fin cut 546 may define a second side of the edges of the active regions 504 and 508, and the fin cut 548 may define a first side of the edges of the active regions 506 and 510 of the standard tie cell device 500, for a layout tool. In one configuration, the width of the inactive region 550 between the active regions 504 and 506, and 508 and 510 may be approximately 0.2 um in the first direction.

In an aspect, the active region 504 includes a first metal diffusion contact A (CA) interconnect 518, a first via (via V0) 534, a second CA interconnect 520, and a second via V0 536, that may connect the plurality of fins associated with the at least one MOS FinFET of the active region 504 to the power rail 514. Similarly, the active region 508 includes a first CA interconnect 526, a first via V0 538, a second CA interconnect 528, and a second via V0 540, that may connect the plurality of fins associated with the at least one MOS FinFET of the active region 508 to the power rail 512. The active region 506 includes a first CA interconnect 522 and a second CA interconnect 524, that may connect the plurality of fins associated with the at least one MOS FinFET of the active region 506 to the power rail 514. Similarly, the active region 510 includes a first CA interconnect 530 and a second CA interconnect 532, that may connect the plurality of fins associated with the at least one MOS FinFET of the active region 510 to the power rail 512. In one configuration, each of the first CA interconnects 518, 522, 526, and 530 and the second CA interconnects 520, 524, 528, and 532 may extend in the second direction.

Figure 6:
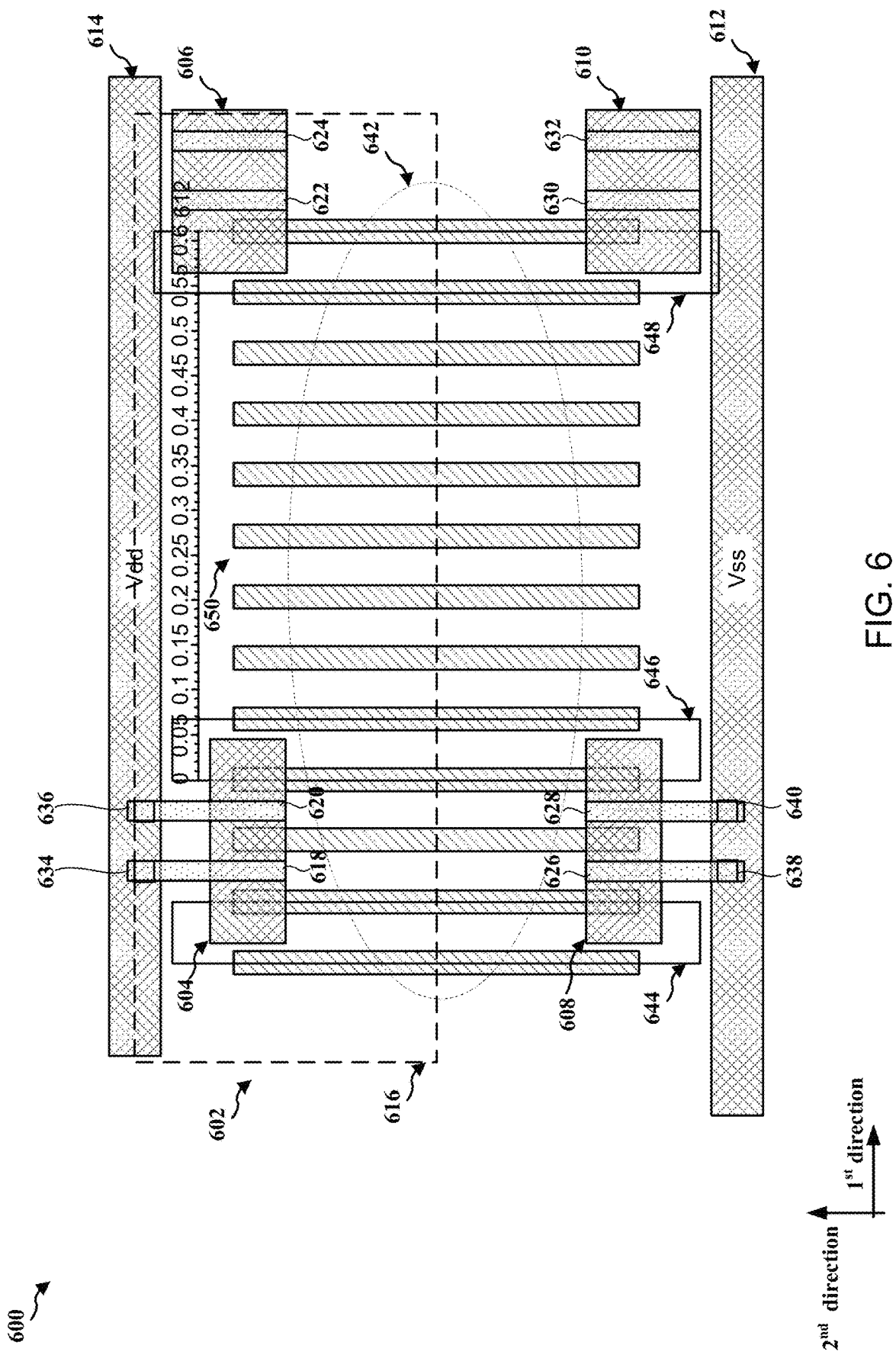
FIG. 6 is an example diagram illustrating a plan view of an example modified tie cell device with extended inactive region.

FIG. 6 is an example diagram illustrating a plan view of an example modified tie cell device 600 with an extended inactive region formed on a p-type substrate 602 (e.g., silicon substrate). The modified tie cell device 600 ties an n-well 616 to Vdd and the p-type substrate 602 to Vss. The modified tie cell device 600 includes an n-well 616, a power rail 614 extending in a first direction that is configured to provide a positive supply voltage (e.g., Vdd) to the modified tie cell device 600, and a power rail 612 extending in the first direction that is configured to provide a negative supply voltage/ground (e.g., Vss) to the modified tie cell device 600.

In the exemplary configuration of FIG. 6, the modified tie cell device 600 includes active regions 604, 606, 608, and 610. The active regions 604 and 606 that are formed on the n-well 616, may be p-type active regions. However, the active regions 608 and 610 that are formed on the p-type substrate 602, may be n-type active regions. In one configuration, each of the active regions 604, 606, 608, and 610 of the modified tie cell device 600, may include at least one MOS FinFET and a plurality of fins associated with the at least one MOS FinFET. The region of the p-type substrate 602 between the active regions 604 and 606, and between 608 and 610, and between power rails 614 and 612, of the modified tie cell device 600, is an inactive region 650. The modified tie cell device 600 also includes a plurality of M1 interconnects 642 extending in a second direction in the inactive region 650. The second direction is orthogonal to the first direction.

In an aspect, the active region 604 includes a first CA interconnect 618, a first via V0 634, a second CA interconnect 620, and a second via V0 636, that may connect the plurality of fins associated with the at least one MOS FinFET of the active region 604 to the power rail 614. Similarly, the active region 608 includes a first CA interconnect 626, a first via V0 638, a second CA interconnect 628, and a second via V0 640, that may connect the plurality of fins associated with the at least one MOS FinFET of the active region 608 to the power rail 612. The active region 606 includes a first CA interconnect 622 and a second CA interconnect 624, that may connect the plurality of fins associated with the at least one MOS FinFET of the active region 606 to the power rail 614. Similarly, the active region 610 includes a first CA interconnect 630 and a second CA interconnect 632, that may connect the plurality of fins associated with the at least one MOS FinFET of the active region 610 to the power rail 612. In one configuration, each of the first CA interconnects 618, 622, 626, and 630 and the second CA interconnects 620, 624, 628, and 632 may extend in the second direction.

As shown in FIG. 6, in one configuration, multiple fin cut regions 644, 646, and 648 may define the edges of the active regions 604, 606, 608, and 610 of the modified tie cell device 600, for a layout tool. In particular, the fin cut 644 may define a first side of the edges of the active regions 604 and 608, the fin cut 646 may define a second side of the edges of the active regions 604 and 608, and the fin cut 648 may define a first side of the edges of the active regions 606 and 610, of the modified tie cell device 600, for a layout tool. In one configuration, the width of the inactive region 650 between the active regions 604 and 606, and 608 and 610 may be at least 0.6 um in the first direction, which may be much larger than the width (0.2 um) of the inactive region 550 between the active regions 504 and 506, and 508 and 510, in the standard tie cell device 500. Because of the larger inactive region 650, the width (at least 0.6 um) of the modified tie cell device 600 may be larger than the width (0.2 um) of the standard tie cell device 500.

In a MOS IC including a plurality of standard cells, a plurality of standard tie cell devices 500, and a plurality of modified tie cell devices 600, the modified tie cell devices 600 adjacent to the standard tie cell devices 500 may appear as an irregular pattern in the MOS IC due to the difference in the width of the inactive regions 650 (e.g., at least 0.6 um) and 550 (e.g., 0.2 um) of the modified tie cell device 600 and the standard tie cell device 500. Therefore, at LVP expanded magnification view during the CAD alignment process, the modified tie cell devices 600 may appear as an irregular pattern in the MOS IC, which may make the modified tie cell devices 600 easily identifiable. Therefore, the plurality of the modified tie cell devices 600 in a MOS IC device may be used as visible alignment markers/fiducials during the CAD alignment of different EFI tools (e.g., LVP).

Figure 7:
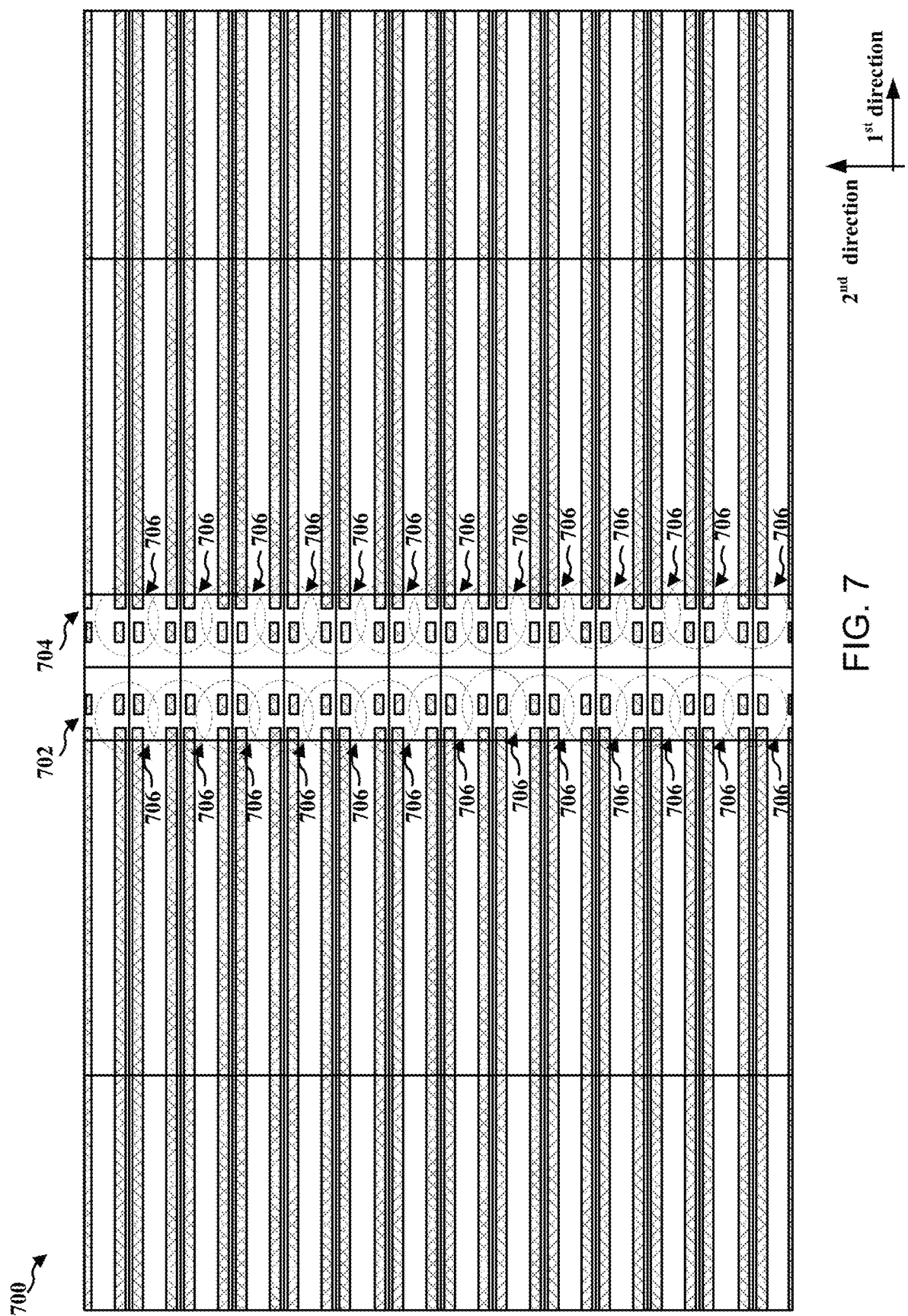
FIG. 7 is an example diagram illustrating a MOS IC device including a plurality of standard tie cell devices stacked together in a two columns.

FIG. 7 is an example diagram illustrating a layout of a MOS IC device 700 including a plurality of standard tie cell devices 706 stacked together in a first column 702 and a second column 704. The first column 702 and the second column 704 of the MOS IC device 700 may extend in the second direction. The standard tie cell device 706 may be the standard tie cell device 500 of FIG. 5. The width of the inactive region (e.g., 550 in FIG. 5) between two active regions (e.g., 504 and 506 in FIG. 500) of a standard tie cell device 706 may be approximately 0.2 um in the first direction, which may be less than the width (e.g., at least 0.6 um) of the inactive region (e.g., 650 in FIG. 6) of a modified tie cell device (e.g., 600 of FIG. 6). As shown in the layout of the MOS IC device 700 of FIG. 7, due to the absence of the modified tie cell devices (e.g., 600 of FIG. 6), which may be used as visible alignment markers, performing CAD alignment during the LVP measurement of the MOS IC device 700 may be extremely difficult.

Figure 8A:
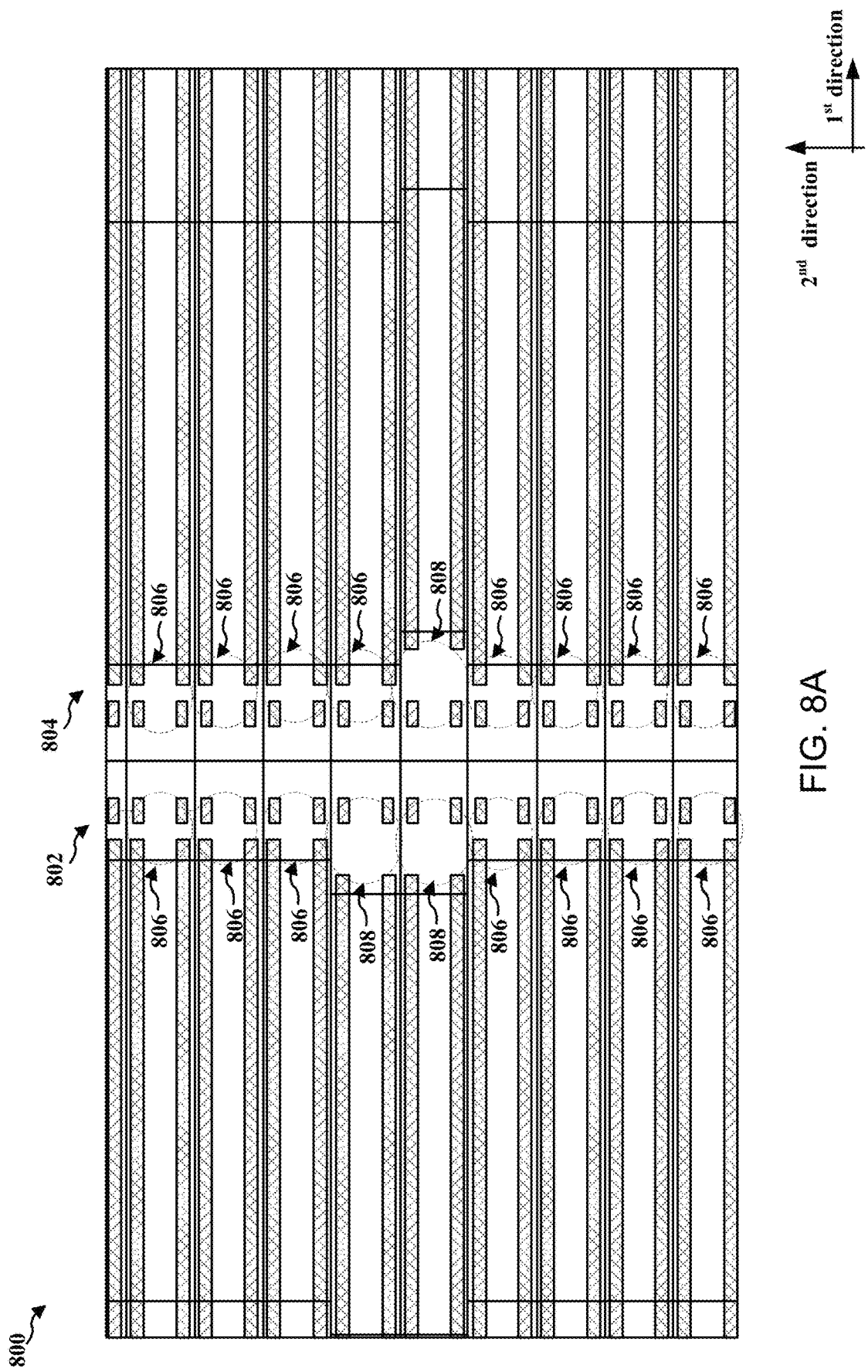
FIG. 8A is an example diagram illustrating a layout of a MOS IC device.
Figure 8B:
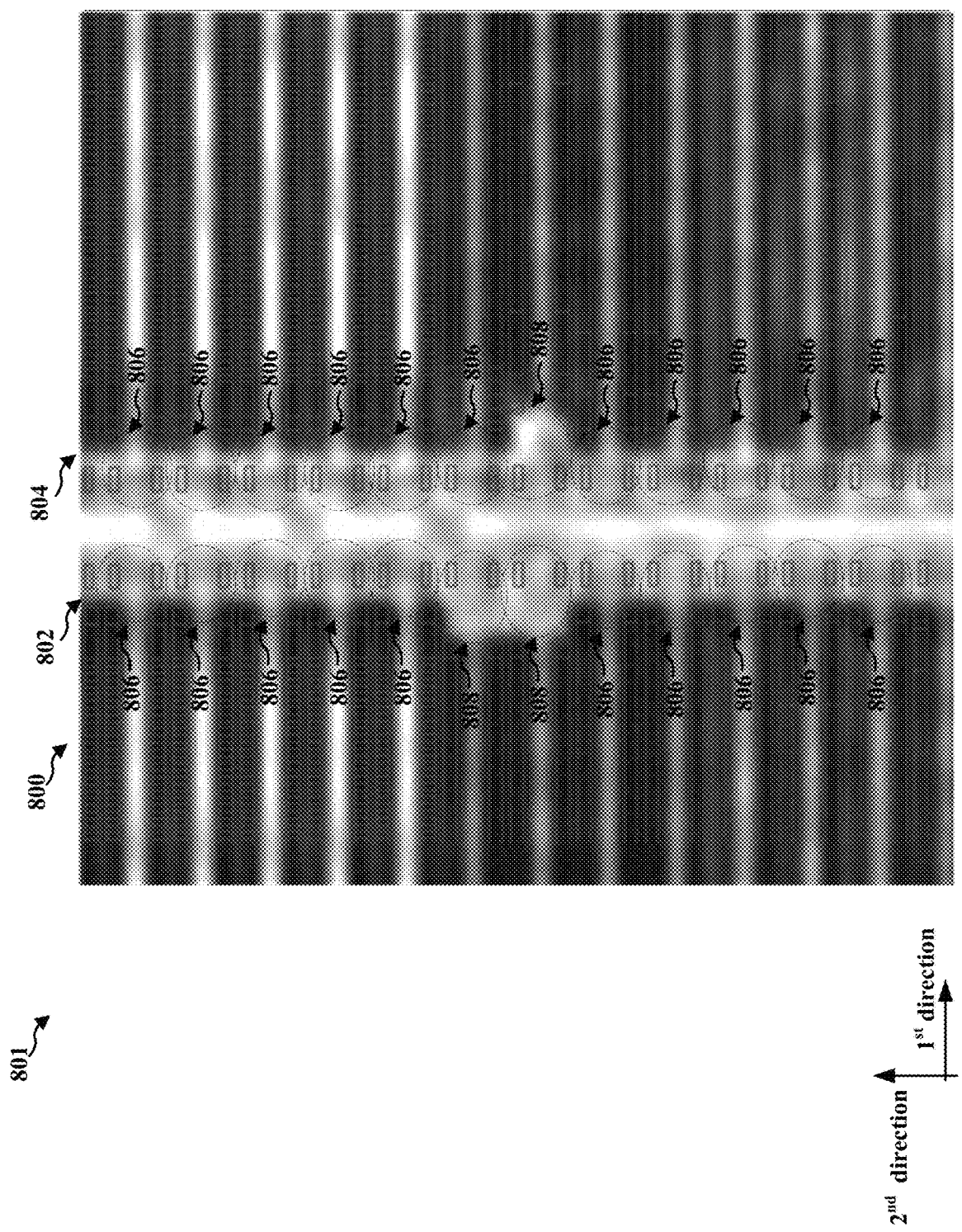
FIG. 8B illustrates an LVP image of the MOS IC device of FIG. 8A.

FIG. 8A is an example diagram illustrating a layout of a MOS IC device 800. FIG. 8B illustrates an LVP image 801 of the MOS IC device 800. The MOS IC device 800 includes a plurality of standard tie cell devices 806 and a plurality of modified tie cell devices 808 stacked together in a first column 802 and a second column 804. The first column 802 and the second column 804 of the MOS IC device 800 may extend in the second direction. The MOS IC device 800 may also include a plurality of standard cells.

In some configurations, the standard tie cell device 806 may be the standard tie cell device 500 of FIG. 5 and the modified tie cell device 808 may be the modified tie cell device 600 of FIG. 6. In one configuration, a plurality of the modified tie cell devices 808 may be inserted into the MOS IC device 800 in such a way that each 50 um of the first column 802 and each 50 um of the second column 804 of the MOS IC device 800, may include at least two of the modified tie cell devices 808. In one configuration, the width of the inactive region (e.g., 550 in FIG. 5) between two active regions (e.g., 504 and 506 in FIG. 500) of a standard tie cell device 806 may be approximately 0.2 um in the first direction, which may be less than the width (e.g., at least 0.6 um) of the inactive region (e.g., 650 in FIG. 6) of a modified tie cell device 808. In one configuration, the extended inactive region (e.g., 650 in FIG. 6, width at least 0.6 um) in a modified tie cell device 808 may reflect substantially more electromagnetic radiation/laser during the LVI/LVP CAD alignment compared to the smaller inactive region (e.g., 550 in FIG. 5, width 0.2 um) of a standard tie cell device 806.

In an aspect, when the plurality of the modified tie cell devices 808 are inserted into the MOS IC device 800, the plurality of modified tie cell devices 808 adjacent to the standard tie cell devices 806 may create unique pseudo/random pattern in the first column 802 and the second column 804 of the MOS IC device 800, due to the difference in the width of the inactive regions (e.g., 650, width at least 0.6 um, and 550, width 0.2 um) of the modified tie cell device 808 and the standard tie cell device 806. Such unique pseudo/random patterns may appear as "key" notches in the first column 802 and the second column 804 of the MOS IC device 800. In some embodiments, the "key" notches that are created by the modified tie cell devices 808 in the first column 802 and the second column 804 are easily identifiable at LVP expanded magnification view during the CAD alignment process. Accordingly, the plurality of the modified tie cell devices 808 in the MOS IC device 800 may be used as fiducials or visible alignment markers during the CAD alignment of different EFI tools (e.g., LVP). In one configuration, the modified tie cell devices 808 may be an order of magnitude smaller compared to existing global alignment markers used in LVP/LVI CAD alignment process. Additionally, successful imaging (e.g., 801) shows that these LVP fiducials (e.g., 808) significantly increase CAD-to-image alignment accuracy and efficiency. Furthermore, the "key/notch" that are created by the modified tie cell devices 808 with extended inactive region, may enable accurate CAD orientation on regularly repeating structures.

Figure 9:
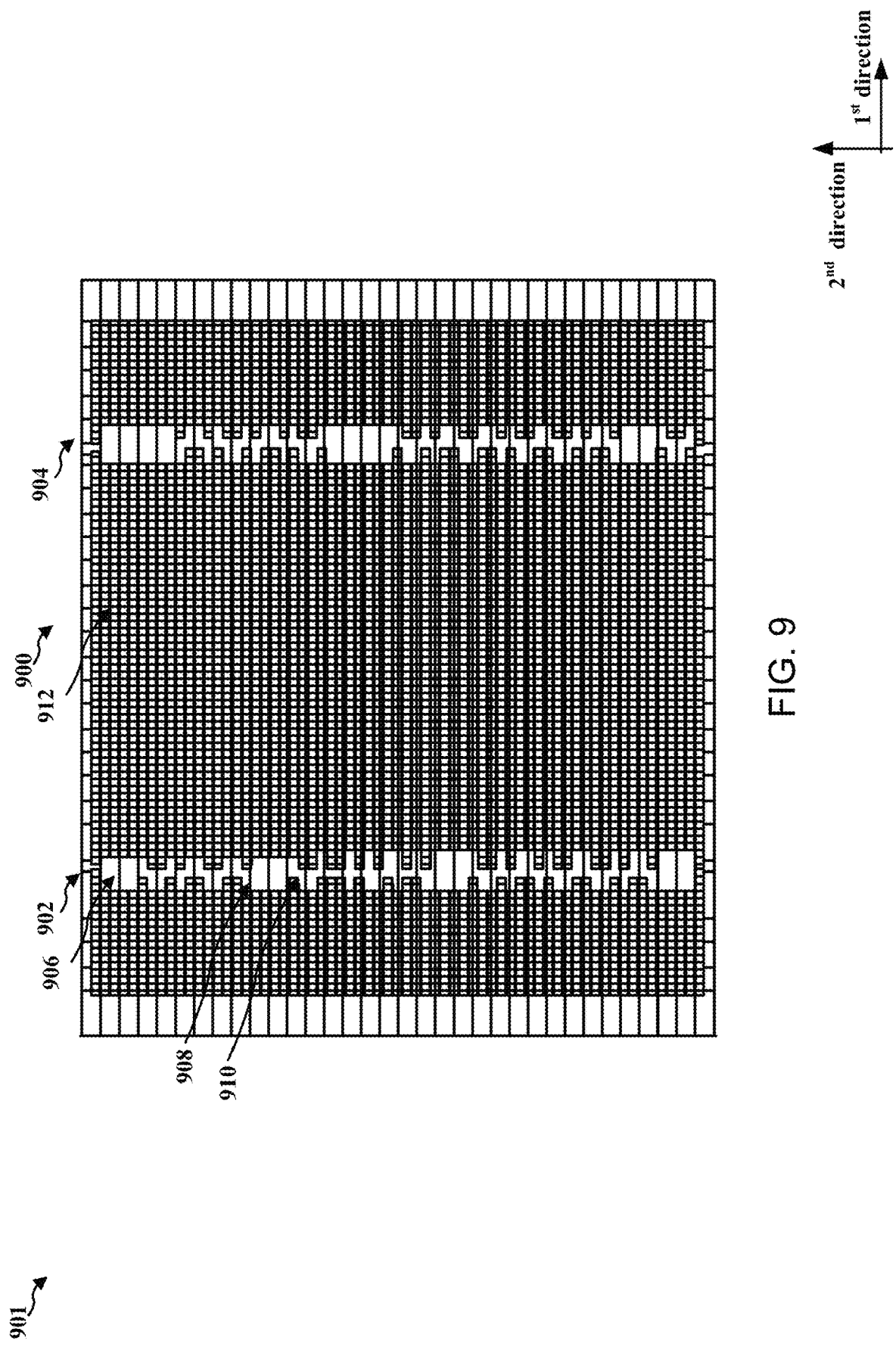
FIG. 9 illustrates a schematic representation of an LVP image of a MOS IC device.

FIG. 9 illustrates a schematic representation of an LVP image 901 of a MOS IC device 900. The MOS IC device 900 includes a plurality of first modified tie cell devices 906, second modified tie cell devices 908, and third modified tie cell devices 910 stacked together in a first column 902 and a second column 904. The first column 902 and the second column 904 of the MOS IC device 900 may extend in the second direction. The MOS IC device 900 may also include a plurality of standard cell device 912.

In some configurations, the first modified tie cell device 906 may be the modified tie cell device 600 of FIG. 6. The second modified tie cell devices 908 and the third modified tie cell devices 910 may be the two embodiments of modified tie cell device 600 of FIG. 6. For example, the width of the inactive region (e.g., 650 in FIG. 6) in the first modified tie cell device 906 may be at least 0.6 um. However, in case of the second modified tie cell device 908, the fin cut may be aligned at right and the width of inactive region may be less than 0.6 um. On the other hand, in case of the third modified tie cell device 910, the fin cut may be aligned at left and the width of inactive region may be less than 0.6 um.

In one configuration, a plurality of the first modified tie cell devices 906, the second modified tie cell devices 908, and the third modified tie cell devices 910 may be inserted into the MOS IC device 900 in such a way that each 50 um of the first column 902 and each 50 um of the second column 904 of the MOS IC device 900 may include at least two of the first modified tie cell devices 906, the second modified tie cell devices 908, and/or the third modified tie cell devices 910. In one configuration, the width of the first modified tie cell device 906 may be greater than the width of the inactive region of the second modified tie cell device 908 and the third modified tie cell device 910. The extended inactive region in each of the first modified tie cell devices 906, the second modified tie cell devices 908, and the third modified tie cell devices 910 may be able to reflect substantially more electromagnetic radiation/laser during the LVI/LVP CAD alignment compared to the standard cell devices 912.

In an aspect, when the plurality of the standard cell devices 912, the first modified tie cell devices 906, the second modified tie cell devices 908, and the third modified tie cell devices 910 are inserted into the MOS IC device 900, due to the extended inactive region (e.g. 906) or the inactive region that is aligned to the right (e.g., 908) or the inactive region that is aligned to the left (e.g., 910), the plurality of the first modified tie cell devices 906, the second modified tie cell devices 908, and the third modified tie cell devices 910 along with the standard cell devices 912 may create unique pseudo/random pattern in the first column 902 and second column 904 of the MOS IC device 900. Such unique pseudo/random patterns may appear as "key" notches in the first column 902 and second column 904 of the MOS IC device 900. In some embodiments, the "key" notches that are created by the first modified tie cell devices 906, the second modified tie cell devices 908, and the third modified tie cell devices 910, in the first column 902 and the second column 904 of the MOS IC device 900, are easily identifiable at LVP expanded magnification view during the CAD alignment process. Accordingly, the plurality of the first modified tie cell devices 906, the second modified tie cell devices 908, and the third modified tie cell devices 910 in the MOS IC device 900 may be used as fiducials or visible alignment markers during the CAD alignment of different EFI tools (e.g., LVP). In one configuration, these LVP fiducials (e.g., 908, 910) significantly increase CAD-to-image alignment accuracy and efficiency. Furthermore, the "key/notch" that are created by the first modified tie cell devices 906, the second modified tie cell devices 908, and the third modified tie cell devices 910 with extended inactive region or the inactive region that is aligned to the right/left, may enable accurate CAD orientation on regularly repeating structures.

FIG. 10 is a flowchart 1000 of a method of probing a MOS IC. The MOS IC may include a plurality of standard cells. For example, the MOS IC may include a plurality of standard cells (300, 600, 402, 404, 808) of FIGS. 3, 4, 6, and 8. In one configuration, the flowchart 1000 described in FIG. 10 may be the LVI/LVP CAD alignment method described above with reference to FIGS. 1A-1B.

At 1002, an ATE stimulus is applied to the IC. For example, as discussed with respect to FIGS. 1A-1B, in order to probe a MOS IC device 104 using LVI/LVP CAD alignment process, the MOS IC device 104 being probed may be electrically stimulated using ATE stimulus 102.

At 1004, a SIL may be placed adjacent to a side of the IC. For example, as discussed with respect to FIGS. 1A-1B, a SIL 110 may be placed adjacent to the backside 108 of the MOS IC device 104. In an aspect, as shown in FIGS. 4 and 8, a subset (402, 404, 808) of the plurality of standard cells (402, 404, 406, 806, 808) includes fiducials. In some configurations, as shown in FIGS. 4 and 8, each 50 um square area on the IC (400, 800) includes at least two standard cells (402, 404, 808) with the fiducials.

Next, at 1006, the IC may be scanned through the SIL with a laser source to obtain a scanned image. For example, as discussed with respect to FIGS. 1A-1B, the MOS IC device 104 may be scanned through the SIL 110 with a laser source 114 to obtain a scanned LSM image 132.

Next, at 1008, the SIL may be aligned to features on the IC based on the scanned image including the fiducials in the subset of the plurality of standard cells. For example, as discussed with respect to FIGS. 1A-1B, 3, 4, 6 and 8, the SIL 110 may be aligned to the features on the IC 104 based on the scanned LSM image including the fiducials the subset of the plurality of the standard cells (300, 600, 402, 404, 808).

In one configuration, a MOS IC includes a first standard cell (300, 600). The first standard cell (300, 600) includes a first power rail (310, 614) configured to provide a first voltage (Vdd) to the first standard cell (300, 600). The first power rail (310, 614) extends in a first direction. The first standard cell (300, 600) further includes a second power rail (328, 330, 612) configured to provide a second voltage (Vss) less than the first voltage (Vdd) to the first standard cell (300, 600). The second power rail (328, 330, 612) extends in the first direction. The first standard cell (300, 600) also includes a first active region (312, 320, 604) between the first power rail (310, 614) and the second power rail (328, 330, 612) on a first side of the first standard cell (300, 600). In addition, the first standard cell (300, 600) includes a second active region (316, 324, 606) between the first power rail (310, 614) and the second power rail (328, 330, 612) on a second side of the first standard cell (300, 600). The second side of the first standard cell (300, 600) is opposite to the first side of the first standard cell (300, 600). The second active region (316, 324, 606) is separated from the first active region (312, 320, 604). Moreover, the first standard cell (300, 600) includes a plurality of metal interconnects (332, 334, 642) extending in a second direction between the first active region (312, 320, 604) and the second active region (316, 324, 606) and between the first power rail (310, 614) and the second power rail (328, 330, 612). The second direction is orthogonal to the first direction. In one configuration, the plurality of metal interconnects (332, 334, 642) are M1 interconnects (332, 334, 642).

The first standard cell (300, 600) further includes a third active region (314, 322, 608) between the first active region (312, 320, 604) and one of the first power rail (310, 614) or the second power rail (328, 330, 612) on the first side of the first standard cell (300, 600). The third active region (314, 322, 608) is adjacent to the first active region (312, 320, 604). The first standard cell (300, 600) also includes a fourth active region (318, 326, 610) between the second active region (316, 324, 606) and one of the first power rail (310, 614) or the second power rail (328, 330, 612) on the second side of the first standard cell (300, 600). The fourth active region (318, 326, 610) is adjacent to the second active region (316, 324, 606). The fourth active region (318, 326, 610) is separated from the third active region (314, 322, 608).

In one configuration, a region between the first active region (312, 320, 604) and the second active region (316, 324, 606) and between the third active region (314, 322, 608) and the fourth active region (318, 326, 610) is an inactive region (344, 346, 650). The inactive region (344, 346, 650) is between the first power rail (310, 614) and the second power rail (328, 330, 612). The width of the inactive region (344, 346, 650) is at least 0.6 um and the height of the inactive region (344, 346, 650) is at least 0.7 um. In one aspect, each of the first active region (312, 320, 604), the second active region (316, 324, 606), the third active region (314, 322, 608), and the fourth active region (318, 326, 610) includes at least one MOS FinFET and a plurality of fins associated with the at least one MOS FinFET.

In one configuration, the MOS IC (400) further includes a plurality of additional standard cells (402, 404, 300). Each additional standard cell (402, 404, 300) of the plurality of additional standard cells (402, 404, 300) includes an inactive region (344, 346) that has a width of at least 0.6 um. The first standard cell (402, 404, 300) and the plurality of additional standard cells (402, 404, 300) are a first set of standard cells. Each 50 um square area on the MOS IC (400) includes at least two standard cells (402, 404, 300) of the first set of standard cells (402, 404, 300). The height of the inactive region (344, 346) of a first subset (402, 300) of the first set of standard cells (402, 404, 300) is greater than a height of the inactive region of each standard cell (404) of a second subset (404) of the first set of standard cells (402, 404, 300).

The width of the inactive region of a first subset (404) of the first set of standard cells (402, 404, 300) is greater than the width of the inactive region (344, 346) of each standard cell of a second subset (402, 300) of the first set of standard cells (402, 404, 300).

In one configuration, the MOS IC (400) further includes a second set (406) of standard cells located on the IC with the first set of standard cells (402, 404). The first set of standard cells (402, 404) are configured to reflect substantially more electromagnetic radiation than the second set of standard cells (406).

In some configurations, the first standard cell (600) is a tap cell configured to tie at least one of an n-well (616) of the first standard cell (600) to the first voltage (Vdd) or a p-substrate (602) of the first standard cell (600) to the second voltage (Vss).

In one configuration, the MOS IC (800) further includes a plurality of additional standard cells (806, 500). The first standard cell (808, 600) and the plurality of additional standard cells (806, 500) are a first set of standard cells (500, 600, 806, 808). The first set of standard cells (500, 600, 806, 808) are located in a first column (802) extending in the second direction. In some configurations, a width (e.g., at least 0.6 um) of the first standard cell (808, 600) is greater than a width (e.g., 0.2 um) of at least one standard cell of the plurality of additional standard cells (806, 500). In one configuration, a width (e.g., at least 0.6 um) of the inactive region (650) of the first standard cell (808, 600) is greater than a width (e.g., 0.2 um) of at least one inactive region (550) of the plurality of additional standard cells (806, 500). In some configurations, the first set of standard cells (500, 600, 806, 808) extend across the IC in the first column (802) in the second direction. In an aspect, within every 50 um of the first column (802), at least two standard cells of the first set of standard cells (500, 600, 806, 808) have widths that are approximately equal. Specifically, within every 50 um$^2$ there are at least two fiducials (808, 600). In some embodiments, within every 50 um$^2$ there are at least three fiducials (808, 600).

In one configuration, the MOS IC (800) further includes a second set of standard cells (806, 808, 500, 600) extending in the second direction in a second column (804) adjacent the first column (802). A first subset (806, 500) of standard cells of the second set of standard cells (806, 808, 500, 600) have a first width (e.g., 0.2 um). A second subset (808, 600) of standard cells of the second set of standard cells (806, 808, 500, 600) have a second width (e.g., at least 0.6 um) greater than the first width (e.g., 0.2 um). The second width (e.g., at least 0.6 um) is approximately equal to the width of the first standard cell (808, 600).

In an aspect, the MOS IC (800) includes a plurality of standard tap cells (806, 500) located in a column (802, 804). The MOS IC (800) also includes a plurality of modified standard tap cells (808, 600). The plurality of modified standard tap cells (808, 600) are located in the column (802, 804). In one configuration, a width (e.g., at least 0.6 um) of each modified standard tap cell (808, 600) of the plurality of modified standard tap cells (808, 600) is wider than a width (e.g., 0.2 um) of each standard tap cell (806, 500) of the plurality of standard tap cells (806, 500). In some configurations, the plurality of standard tap cells (806, 500) and the plurality of modified standard tap cells (808, 600) form one or more fiducials usable in LVP CAD alignment (100).

In one configuration, each standard tap cell (806, 500) of the plurality of standard tap cells (806, 500) includes a first power rail (514). The first power rail (514) is configured to provide a first voltage (Vdd) to the standard tap cell (806, 500). The first power rail (514) extends in a first direction. The standard tap cell (806, 500) also includes a second power rail (512) configured to provide a second voltage (Vss) less than the first voltage (Vdd) to the standard tap cell (806, 500). The second power rail (512) extends in the first direction. The standard tap cell (806, 500) further includes a first active region (504) between the first power rail (514) and the second power rail (512) on a first side of the standard tap cell (806, 500). In one configuration, the first active region (504) includes a plurality of fins associated with at least one MOS FinFET connected to the first power rail (514). Moreover, the standard tap cell (806, 500) includes a second active region (506) between the first power rail (514) and the second power rail (512) on a second side of the standard tap cell (806, 500). The second side of the standard tap cell (806, 500) is opposite to the first side of the standard tap cell (806, 500). The second active region (506) is separated from the first active region (504). In an aspect, the second active region (506) includes a plurality of fins associated with at least one MOS FinFET connected to the first power rail (514). Additionally, the standard tap cell (806, 500) includes a plurality of metal interconnects (542) extending in a second direction between the first active region (504) and the second active region (506) and between the first power rail (514) and the second power rail (512). The second direction is orthogonal to the first direction. In one configuration, the plurality of metal interconnects (542) are M1 interconnects (542).

In an aspect, the standard tap cell (806, 500) further includes a third active region (508) between the first active region (504) and one of the first power rail (514) or the second power rail (512) on the first side of the standard tap cell (806, 500). The third active region (508) is adjacent to the first active region (504). In one configuration, the third active region (508) includes a plurality of fins associated with at least one MOS FinFET connected to the second power rail (512). The standard tap cell (806, 500) also includes a fourth active region (510) between the second active region (506) and one of the first power rail (514) or the second power rail (512) on the second side of the standard tap cell (806, 500). The fourth active region (510) is adjacent to the second active region (506). In an aspect, the fourth active region (510) is separated from the third active region (508). In one configuration, the fourth active region (510) includes a plurality of fins associated with at least one MOS FinFET connected to the second power rail (512).

In some configurations, a region (550) between the first active region (504) and the second active region (506) and between the third active region (508) and the fourth active region (510) is an inactive region (550). The inactive region (550) is between the first power rail (514) and the second power rail (512). In an aspect, a width (e.g., at least 0.6 um) of the inactive region (650) of each modified standard tap cell (808, 600) of the plurality of modified standard tap cells (808, 600) is greater than a width (e.g., 0.2 um) of the inactive region (550) of each standard tap cell (806, 500) of the plurality of standard tap cells (806. 500). In one configuration, each 50 um of the column (802, 804) includes at least two of the modified standard tap cells (808, 600). In some configurations, the column (802, 804) extends in the second direction. In an aspect, the width of the inactive region (550) of each standard tap cell (806, 500) is 0.2 um and the width of the inactive region (650) of each modified standard tap cell (808, 600) is 0.6 um.

In an aspect, the standard tap cell (806, 500) is configured to tie at least one of n-well (516) of the standard tap cell (806, 500) to the first voltage (Vdd) or a p-substrate (502) of the standard tap cell (806, 500) to the second voltage (Vss). In one configuration, each modified standard tap cell (808, 600) of the plurality of modified standard tap cells (808, 600) is configured to reflect substantially more electromagnetic radiation than each standard tap cell (806, 500) of the plurality of standard tap cells (806, 500).

In one configuration, the MOS IC (800) further includes one or more additional columns (802, 804) adjacent to the column (802, 804) extending in the second direction. In an aspect, each of the one or more additional columns (802, 804) includes a plurality of standard tap cells (806, 500) and modified standard tap cells (808, 600). In some configurations, each 50 um of each of the one or more additional columns (802, 804) includes at least two of the modified standard tap cells (808, 600).

In an aspect, MOS IC includes a first standard cell (300, 600). The first standard cell (300, 600) includes a first power rail (310, 614) configured to provide a first voltage (Vdd) to the first standard cell (300, 600). The first power rail (310, 614) extends in a first direction. The first standard cell (300, 600) further includes a second power rail (328, 330, 612) configured to provide a second voltage (Vss) less than the first voltage (Vdd) to the first standard cell (300, 600). The second power rail (328, 330, 612) extends in the first direction. The first standard cell (300, 600) also includes a first active region (312, 320, 604) between the first power rail (310, 614) and the second power rail (328, 330, 612) on a first side of the first standard cell (300, 600). In addition, the first standard cell (300, 600) includes a second active region (316, 324, 606) between the first power rail (310, 614) and the second power rail (328, 330, 612) on a second side of the first standard cell (300, 600). The second side of the first standard cell (300, 600) is opposite to the first side of the first standard cell (300, 600). In one configuration, the second active region (316, 324, 606) is separate from the first active region (312, 320, 604). Moreover, the first standard cell (300, 600) further includes a means for reflecting (332, 334, 642) electromagnetic radiation. The means for reflecting (332, 334, 642) electromagnetic radiation is extending in a second direction between the first active region (312, 320, 604) and the second active region (316, 324, 606) and between the first power rail (310, 614) and the second power rail (328, 330, 612). The second direction is orthogonal to the first direction. In one configuration, the means for reflecting (332, 334, 642) electromagnetic radiation includes a plurality of M1 interconnects (332, 334, 642).

In one configuration, a method of probing a MOS IC (104) includes a plurality of standard cells (300, 600). The method of probing includes applying an ATE stimulus (102) to the IC (104). The method of proving further includes placing a SIL (110) adjacent to a side (108) of the IC (104). In an aspect, a subset of the plurality of standard cells (300, 600) includes fiducials. In some configurations, each 50 um square area on the IC (104) includes at least two standard cells (300, 600) with the fiducials. In an aspect, the method of probing also includes scanning the IC (104) through the SIL (110) with a laser source (114) to obtain a scanned image (132). Moreover, the method of probing includes aligning the SIL (110) to features on the IC (104) based on the scanned image (132) including the fiducials in the subset of the plurality of standard cells (300, 600).

In an aspect, each standard cell (300, 600) in the subset of the plurality of standard cells (300, 600) includes a first power rail (310, 614) configured to provide a first voltage (Vdd) to the standard cell (300, 600). The first power rail (310, 614) extends in a first direction. The standard cell (300, 600) further includes a second power rail (328, 330, 612) configured to provide a second voltage (Vss) less than the first voltage (Vdd) to the standard cell (300, 600). The second power rail (328, 330, 612) extends in the first direction. The standard cell (300, 600) also includes a first active region (312, 320, 604) between the first power rail (310, 614) and the second power rail (328, 330, 612) on a first side of the standard cell (300, 600). In addition, the standard cell (300, 600) includes a second active region (316, 324, 606) between the first power rail (310, 614) and the second power rail (328, 330, 612) on a second side of the standard cell (300, 600). The second side of the standard cell (300, 600) is opposite to the first side of the standard cell (300, 600). The second active region is separated from the first active region. Moreover, the standard cell (300, 600) includes a plurality of metal interconnects (332, 334, 642) extending in a second direction between the first active region (312, 320, 604) and the second active region (316, 324, 606) and between the first power rail (310, 614) and the second power rail (328, 330, 612). The second direction is orthogonal to the first direction.

As discussed supra, in 10 nm and smaller IC technology, with the increasing density and decreasing feature sizes, the current EFI tools (e.g., LVI, LVP) are reaching the limit of image resolution, which consequently translates to problems with CAD-to-image alignment, since it becomes very hard to distinguish one feature from another without the presence of appropriate fiducials for 10 nm and smaller technology. Because of the large size, the currently available fiducials are not appropriate for the 10 nm and smaller technology. Further, since the FOV of the SIL used for LVI is 50 um×50 um, in the 10 nm and smaller technology, accurate CAD-to-image alignment requires at least two or more fiducials in the FOV of SIL.

The different embodiments (300, 600) of the disclosure may be used as fiducials in a 10 nm and smaller MOS IC device. In one configuration, the different embodiments of the fiducials may be a modified standard cell device (300) or a modified tie cell device (600) with an extended inactive region (344, 346, 650). In one configuration, the width of the inactive region (344, 346, 650) of the different embodiments (300, 600) of the fiducials may be at least 0.6 um, which may be much larger than the width (0, 0.2 um) of the inactive region (550) in a standard cell device (400) or a standard tie cell device (500). Due to the large (e.g., at last 0.6 um) inactive regions (e.g., 344, 346, 650), the modified standard cell device (300) and the modified tie cell device (600) may be extremely reflective of the electromagnetic radiation/laser. Therefore, the modified standard cell device (300) and the modified tie cell device (600) that may be used as fiducials in a 10 nm and smaller MOS IC, may reflect substantially more electromagnetic radiation/laser during the LVI/LVP CAD alignment compared to the standard cell device (400) or standard tie cell device (500).

In an aspect, the modified standard cell device (300, 402, 404) and the modified tie cell device (600, 808) of the present disclosure, when used as fiducials in MOS IC (400, 800), may use extra space in the MOS IC (400, 800). However, the modified standard cell device (300, 402, 404) and the modified tie cell device (600, 808) may be passive cells, which means the modified standard cell device (300, 402, 404) and the modified tie cell device (600, 808) do not draw power from the power rails (328, 310, 330, 612, 614) even though the modified standard cell device (300, 402, 404) and the modified tie cell device (600, 808) are connected to the power rails (328, 310, 330, 612, 614). In one configuration, the density of the fiducials (300, 600, 402, 404, 808) in a 10 nm or smaller MOS IC (400, 800) may be at least two (808, 402, 404, 300, 600) within every 50 um² of the MOS IC. In some embodiments, within every 50 um² of a MOS IC (400, 800) there may be at least three fiducials (808, 402, 404, 300, 600).

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A metal oxide semiconductor (MOS) integrated circuit (IC), comprising:
    a first cell comprising:
    a first power rail configured to provide a first voltage to the first cell, the first power rail extending in a first direction;
    a second power rail configured to provide a second voltage to the first cell, the second power rail extending in the first direction;
    a first active region between the first power rail and the second power rail on a first side of the first cell;
    a second active region between the first power rail and the second power rail, the second active region being opposite the first active region, extending along the first direction, and separate from the first active region;
    at least one inactive region between the first active region and the second active region; and
    a plurality of metal interconnects extending in a second direction in the at least one inactive region and between the first power rail and the second power rail, the second direction being orthogonal to the first direction, the plurality of metal interconnects configured to reflect electromagnetic radiation.

2. The MOS IC of claim 1, wherein the plurality of metal interconnects are metal one (M1) interconnects.

3. The MOS IC of claim 1, wherein the first cell further comprises:
    a third active region between the first active region and one of the first power rail or the second power rail, the third active region being adjacent the first active region; and
    a fourth active region between the second active region and one of the first power rail or the second power rail, the fourth active region being adjacent the second active region, the fourth active region being separate from the third active region.

4. The MOS IC of claim 1, wherein a width of the at least one inactive region is at least 0.6 um.

5. The MOS IC of claim 4, wherein a height of the at least one inactive region is at least 0.7 um.

6. The MOS IC of claim 3, wherein one of the first active region, the second active region, the third active region, and the fourth active region includes at least one MOS fin field effect transistor (FinFET) and at least one of a plurality of fins associated with the at least one MOS FinFET.

7. The MOS IC of claim 1, further comprising a plurality of additional cells, each additional cell of the plurality of additional cells including an inactive region that has a width of at least 0.6 um extending in the first direction, the first cell and the plurality of additional cells being a first set of cells, wherein each 50 um square area on the IC includes at least two cells of the first set of cells.

8. The MOS IC of claim 7, wherein a height of the inactive region of a first subset of the first set of cells is greater than a height of the inactive region of each cell of a second subset of the first set of cells.

9. The MOS IC of claim 7, wherein the width of the inactive region of a first subset of the first set of cells is greater than the width of the inactive region of each cell of a second subset of the first set of cells.

10. The MOS IC of claim 7, further comprising a second set of cells located on the IC with the first set of cells, the first set of cells being configured to reflect more electromagnetic radiation than the second set of cells.

11. The MOS IC of claim 1, wherein the first cell is a tap cell configured to tie at least one of an n-type well (n-well) of the first cell to the first voltage or a p-type substrate (p-substrate) of the first cell to the second voltage.

12. The MOS IC of claim 1, further comprising a plurality of additional cells, the first cell and the plurality of additional cells being a first set of cells, the first set of cells located in a first column extending in the second direction, a width of the first cell being greater than a width of at least one cell of the plurality of additional cells.

13. The MOS IC of claim 12, wherein a width of the inactive region of the first cell is greater than a width of at least one inactive region of the plurality of additional cells.

14. The MOS IC of claim 12, wherein the first set of cells extend across the IC in the first column in the second direction.

15. The MOS IC of claim 14, wherein within every 50 um of the first column, at least two cells of the first set of cells have widths that are approximately equal.

16. The MOS IC of claim 12, further comprising a second set of cells extending in the second direction in a second column adjacent the first column, a first subset of cells of the second set of cells having a first width, a second subset of cells of the second set of cells having a second width greater than the first width, the second width being approximately equal to the width of the first cell.

17. A metal oxide semiconductor (MOS) integrated circuit (IC), comprising:
- a first power rail configured to provide a first voltage, the first power rail extending in a first direction;
- a second power rail configured to provide a second voltage, the second power rail extending in the first direction;
- a first active region between the first power rail and the second power rail;
- a second active region between the first power rail and the second power rail, the second active region being opposite the first active region extending along the first direction, and separate from the first active region; and
- means for reflecting electromagnetic radiation, the means for reflecting electromagnetic radiation extending in a second direction between the first active region and the second active region and between the first power rail and the second power rail, the second direction being orthogonal to the first direction, wherein the means for reflecting electromagnetic radiation comprising a plurality of metal one (M1) interconnects.

* * * * *